Patented Aug. 17, 1943

2,327,250

UNITED STATES PATENT OFFICE 2,327,250

METHOD OF TREATING COTTON WADDING AND PRODUCT THEREOF

George A. Cruickshank, Riverside, R. I., assignor to Johnson & Johnson, New Brunswick, N. J., a corporation of New Jersey No Drawing. Application January 5 1940, Serial No. 312,624

8 Claims. (Cl. 210—203)

The invention relates to the treatment of cotton wadding the better to prepare it for manifold purposes and particularly to increase its wet strength in order that it will be adapted for purposes wherein it must be used wet and at the same time possess relatively great strength or resistance as, for example, in the filtration of milk where there is a strong tendency toward distortion and/or displacement of the fibers from impingement or flow of the milk.

According to customary practice, cotton batting is prepared by laying up say 10 to 20 fleeces from a corresponding number of cards in line. No adhesive or other means is required to cause cohesion between the constituent laminae, as the lay of the fibers is sufficiently loose and wild to produce, in the batting, a product in which the individual identities of the constituent laminae are largely lost.

Cotton wadding has in the past been prepared by sizing the cotton batting with starch, on one side or both. Ordinarily, the starch is licked onto the batting from a starch solution of say ¼ of 1% concentration, and the batting is then dried by passage over drum driers. The resulting wadding has what is commonly called an onion skin sizing, due to the resemblance of the surface layer to onion skin paper. An alternative method of making the wadding is to more or less completely impregnate the batting with the starch solution, by one or more treatments therewith, each followed by drying. There is no very great distinction between the waddings made by these two methods except that the second method (impregnation) as may be expected, gives a somewhat denser product and a somewhat greater distribution or penetration of starch sizing beyond the surfaces. After manufacture, the wadding is cut to the desired dimensions for use.

The high absorbency and porosity of cotton wadding, its considerable strength when dry, and its freedom from foreign materials such as fillers and sizing agents (other than the starch, which is present only in a very small amount), make it particularly useful for a number of purposes. Its wet strength more particularly its resistance to disruption or even distortion when subjected to fluids in motion, however, is poor and it is, therefore, not well adapted for purposes wherein it must be used wet and at the same time possess strength. At present the common way of overcoming this lack of wet strength or so-called wash resistance is by facing the wadding on one or both sides with cotton gauze which tend to retain the surface fibers in their original positions. This, however, involves additional steps and additional material, and also in some instances complicates the matter of disposing of the wadding after use.

In spite of its lack of wet strength or lack of wash resistance, cotton wadding made in the conventional manner, and without any gauze facing, is used for some purposes in which it must be completely wet, for example, in the filtration of liquids such as milk. In such uses, however, it disintegrates rapidly. Thus, in filtering it readily tends to wash, i. e. the starch sizing loses its effectiveness and the fibers wash or peel away from areas of the surface, especially under the influence of the usual swirling and other cross currents in the body of the liquid as it comes in contact with the face of the filter. It is usual to provide metal screens above and below the filter but, even so, appreciable washing occurs unless the filter is changed frequently. The washed areas, of course, diminish the efficiency of the filter and also, due to their weakness, are susceptible of being broken through more or less completely by the weight and motion of the liquid.

It is, therefore, an object of this invention to provide cotton wadding which is so bonded that while possessing the desirable absorbency and porosity of ordinary unfaced cotton wadding, also possesses marked wet strength in the sense of greatly improved resistance to washing, when subjected to the flow of liquids through it, as in filtration.

Another object is to employ an improved bonding agent in the preparation of cotton wadding from cotton batting, said bonding agent being applied from water solution and hence requiring neither special solvents nor special procedure in its application.

Other objects will appear from the present disclosure.

The bonding agents used in carrying out the procedure of the present invention must be soluble in hot water, e. g. above about 150° F. and substantially insoluble or non-dispersible in cold water, e. g. at about room temperature or lower. The solubility in hot water may vary considerably between different bonding agents, but those which are suitable must be completely soluble in at least the concentration required for providing a sufficient bond. In some instances a cutting agent may be used to promote water solubility. However, auxiliary agents to promote solubility, setting, or other effects are preferably omitted as it is important for most uses that the finished wadding be entirely free from agents which might in any way contribute toward toxicity, contamination, or adverse physiological properties either in the finished product or in liquids or other materials with which it comes in contact.

The bonding agents must also be capable of providing a wadding which possesses a good wet strength or resistance to washing, as determined by tests as hereinbelow described. These properties must also be achieved without any appreciable sacrifice in porosity and absorbency. They should also be achieved without deleteriously affecting the handling qualities of the wadding, e. g. when the wadding, after manufacture, is cut into shapes which are piled together, the individual shapes should subsequently be readily separable without sticking at the edges or elsewhere or otherwise tending to cause roughing or delamination.

These agents should, therefore, be capable, when applied from their water solution, of forming relatively strong, coherent webs having high strength when subjected to aqueous liquids at about room temperature or lower, specifically below about 100° F.

Inasmuch as a principal use for cotton wadding in which it is subjected to contact with and is completely wetted by liquids is as filters for milk, the wet strength or washing tests referred to above will be described in connection with such use, but without limitation of the general scope and utility of the present invention. In preparing milk filters, the wadding is blanked out into disks of standard sizes, usually six inches in diameter and weighing between 19 and 23 grains, and made up into packages of say 50 or 100 disks. The standard type of apparatus in which the milk is filtered has a capacity of somewhat over 10 quarts, and consists of a cylindrical upper portion attached to a frustro-conical lower portion which tapers downwardly to about a five inch diameter orifice in which the filter disk is placed. The orifice is provided with suitable foraminous top and bottom plates between which the filter is positioned. There are a number of styles and types of these orifice plates commonly available, but for uniformity of results, the so-called "Borden" type arrangement is used in the tests herein described. In practical use, the Borden type is about intermediate, with respect to the conditions imposed upon the filter disks, between mild and severe conditions. The conventional milk filter disk is supported to be discarded after the passage of ten gallons of milk therethrough due to the effects of washing and disintegration.

The tests referred to herein are, therefore, conveniently carried out on filter disks of cotton wadding inserted in a Borden type milk filter through which ten gallons of milk or comparable liquid is poured. Since in ordinary use the milk is at about 80° to 90° F., the milk or other liquid used in the tests should be of essentially the same temperature for comparable results. The filter disks, after this treatment, are then examined for wet strength and for any evidence of washing. When subjected to the conditions of this test, filter disks made of ordinary starch-sized wadding have very little wet strength or resistance to washing; they tend to sag when suspended by one edge, and on crumpling in the hand they cannot be flattened out again without disruption and separation. Ordinarily they do not wash under the conditions of this test but they are about on the borderline between washing and non-washing in this regard, as evidenced by the fact that they do wash occasionally and also by the fact that the passage of any appreciable amount of liquid above ten gallons results in definite washing.

Filter disks made from wadding prepared in accordance with the present invention, on being subjected to the tests just described, show marked wet strength, as evidenced by lack of tendency to sag and by the fact that, after crumpling in the hand, they can be easily spread out into essentially the same shape and condition as before crumpling without appreciable rupture or distortion. They also show no tendency to wash even on the passage of some excess of liquid above ten gallons.

One suitable bonding agent for use in the present invention in agar-agar. For such use this material is made up into a solution containing one part by weight of agar-agar to between 100 to 400 parts of hot water, more or less. The solution is then licked onto the cotton batting and the treated product dried on drums or by other suitable means. The solution is preferably applied to each side of the batting in two separate operations, drying between. In each application the amount of liquid taken up is conveniently about equal to the weight of the cotton batting being treated and the resulting dry wadding should have an amount of agar-agar which is at least about equal to that obtained from two such applications of a 0.25% solution of agar-agar, i. e. should contain at least about 0.50% of dry agar-agar, principally as a surface or porous onion skin bond. Lesser amounts result in a tendency to wash. On the other hand, an amount of agar-agar greater than about 3% on the finished product results in considerable decrease in porosity of the wadding and in excessive density as well as being unnecessary and, hence, wasteful of materials. It is clear that the concentration of the solution may be modified considerably because the number of applications and the amount of each may be varied, but the amount of agar-agar bonding on the finished wadding should preferably be within the limits specified. Wadding so prepared passes fully the requirements of the foregoing test.

Another effective bonding agent and one which is even more effective, weight for weight, than agar-agar, is polyvinyl alcohol of the hot-water soluble, cold-water insoluble or non-dispersible type. Polyvinyl alcohol to which the formula $(-CH_2-CHOH-)_n$ is commonly given, may be prepared in accordance with U. S. Patent No. 1,672,156 and exists in various degrees of water solubility and viscosity, depending principally upon the degree of polymerization. These various types are largely classifiable under two headings: (a) soluble in water at room temperature and thereabouts but of decreased solubility at temperatures in excess of about 150° F.; and (b) insoluble in water at about room temperature or below, although softening and swelling therein, but soluble in water at above about 150° F. The first of these is unsuitable for the present purposes as a bond formed therefrom would be too soluble in water or aqueous fluids at ordinary temperatures; the second of these is, however, very well suited for use in the procedure of this invention. It may be applied in the manner as above described for agar-agar but smaller amounts are required for equal effectiveness, approximately 40% as much being required to give the same results as when agar-agar is used depending upon the source of manufacture of polyvinyl alcohol it being recognized by those familiar with polyvinyl alcohol that the latter product from different sources has slightly different characteristics. Thus, the amount of bond deposited from 0.1% solution of the second of the above-mentioned types of polyvinyl alcohol produced from one known source gives results equivalent to those obtained from an equal weight of an 0.25% solution of agar-agar. As in the case of the latter, the amount of polyvinyl alcohol bond may be considerably increased but more than about 1 to 2% thereof on the completed wadding is not only wasteful of materials but impedes penetrability and porosity and gives a product which is excessively dense and harsh surfaced. About 0.2% of the polyvinyl alcohol bond as derived from one recognized source, confined principally to the surfaces, is the minimum amount which will secure effective wet strength or wash resistance.

Still another suitable bonding agent is sodium alginate. This may be applied in the manner already described using a solution of about 1 part of sodium alginate to between 1000 and 2000 parts of water. Solution is effected by heating, as is done with agar-agar and polyvinyl alcohol. Solutions of sodium alginate are more viscous than those having an equal concentration of either of the other two agents and, hence, the cotton batting tends to pick up larger quantities thereof in the bonding operation. However, the effectiveness of sodium alginate is intermediate that of agar-agar and that of polyvinyl alcohol, on a weight basis. More specifically it is found that approximately the same wet strength or non-washing properties are attained when the relative amounts of bonding of agar-agar, polyvinyl alcohol, and sodium alginate on the wadding are as 2.5:1:1.5.

Other metallic salts of alginic acid may be found to be suitable.

As already pointed out, the wadding made in accordance with this invention should have the bond present largely as a coating on the surface fibers, thus forming an onion skin effect. Appreciable amounts of bond between the two surfaces are not desirable as they reduce porosity and absorbency.

If desired, mixtures of any of the forgoing bonding agents may be used, or mixtures of these with other suitable materials which may or may not contribute to the desired result may be employed.

It should, of course, be understood that other bonding agents meeting the particular requirements herein set forth may also be employed and that the foregoing examples relating to agar-agar, polyvinyl alcohol and sodium alginate are for illustration only and are not to be considered as limiting this invention solely thereto.

Having described the invention, what is claimed as new:

1. Filter media characterized by marked wash resistance, comprising a sheet-like structure of loosely associated fibers, the fibers near and at the surface of the sheet being physically bonded at their points of contact by a cold water non-dispersible bond of polyvinyl alcohol, the interstices between the points of contact of said fibers at and near the surface of said sheet and the interior fibers of said sheeting being relatively free of said bonding substance whereby fluids such as milk may be filtered through said sheet.

2. Filter media characterized by marked wash resistance, comprising a sheet-like structure of loosely associated fibers, the fibers near and at the surface of the sheet being physically bonded at their points of contact by a substance having the property of being cold water non-dispersible, the interstices between the points of contact of said fibers at and near the surface of said sheet and the interior fibers of said sheet being relatively free of said bonding substance whereby fluids such as milk may be filtered through said sheet.

3. Filter media characterized by marked wash resistance, comprising a sheet-like structure of loosely associated fibers, the fibers near and at the surface of the sheet being physically bonded at their points of contact by a bonding substance made from an aqueous solution having not less than 0.2% of a cold water non-dispersible polyvinyl alcohol, the interstices between the points of contact of said fibers at and near the surface of said sheet and the interior fibers of said sheet being relatively free of said bonding substance whereby fluids such as milk may be filtered through said sheet.

4. A filter disk having good handling qualities, normal porosity and absorbency, and high resistance to washing, comprising cellulosic wadding the surface fibers of which are bonded by a bond made from a water solution of a bond of the hot-water soluble cold-water insoluble type containing from 1 to 2% of polyvinyl alcohol.

5. A filter disk having good handling qualities, normal porosity and absorbency, and high resistance to washing, comprising cellulosic wadding the surface fibers of which are bonded by a bond made from a water solution of a bond of the hot-water soluble cold-water insoluble type containing not less than about 0.1% and not more than about 2% of polyvinyl alcohol.

6. Filter media characterized by marked wash resistance, comprising a sheet-like structure of loosely associated fibers, the fibers near and at the surface of the sheet being physically bonded at their points of contact by a cold water non-dispersible agar-agar, the interstices between the points of contact of said fibers at and near the surface of said sheet and the interior fibers of said sheeting being relatively free of said bonding substance whereby fluids such as milk may be filtered through said sheet.

7. Filter media characterized by marked wash resistance, comprising a sheet-like structure of loosely associated fibers, the fibers near and at the surface of the sheet being physically bonded at their points of contact by a cold water non-dispersible sodium alginate, the interstices between the points of contact of said fibers at and near the surface of said sheet and the interior fibers of said sheeting being relatively free of said bonding substance whereby fluids such as milk may be filtered through said sheet.

8. Filter media characterized by marked wash resistance comprising a sheet-like structure of loosely associated fibers, the fibers near and at the surface of the sheet being physically bonded at their points of contact by a cold water non-dispersible bonding substance made from a solution containing not more than 2% of polyvinyl alcohol, the interstices between the points of contact of said fibers at and near the surface of said sheet and the interior fibers of said sheet being relatively free of said bonding substance whereby fluids such as milk may be filtered through said sheet.

GEORGE A. CRUICKSHANK.

Disclaimer 2,327,250.—*George A. Cruickshank*, Riverside, R. I. METHOD OF TREATING COTTON WADDING AND PRODUCT THEREOF. Patent dated Aug. 17, 1943. Disclaimer filed Oct. 15, 1947, by the assignee, *Johnson & Johnson*.

Hereby disclaims from the scope of claim 2 all filter media bonded with substances that are not dispersible in hot water.

[*Official Gazette December 9, 1947.*]